(12) United States Patent
Galli et al.

(10) Patent No.: US 11,782,405 B2
(45) Date of Patent: Oct. 10, 2023

(54) OPERATING DEVICE FOR A MACHINE TOOL

(71) Applicant: HSD S.P.A., Pesaro (IT)

(72) Inventors: Paolo Giuseppe Fulvio Galli, Pesaro (IT); Stefano Benedettini, Pesaro (IT)

(73) Assignee: HSD S.P.A.

( * ) Notice: Subject to any disclaimer, the term of this patent is extended or adjusted under 35 U.S.C. 154(b) by 0 days.

(21) Appl. No.: 17/272,963

(22) PCT Filed: Sep. 3, 2019

(86) PCT No.: PCT/IB2019/057402
§ 371 (c)(1),
(2) Date: Mar. 3, 2021

(87) PCT Pub. No.: WO2020/049449
PCT Pub. Date: Mar. 12, 2020

(65) Prior Publication Data
US 2021/0311444 A1   Oct. 7, 2021

(30) Foreign Application Priority Data
Sep. 3, 2018  (IT) .......................... 102018000008297

(51) Int. Cl.
*G05B 15/02*   (2006.01)
*G06N 20/00*   (2019.01)

(52) U.S. Cl.
CPC ............. *G05B 15/02* (2013.01); *G06N 20/00* (2019.01)

(58) Field of Classification Search
CPC .......... G05B 15/02; G05B 2219/37027; G05B 2219/37226; G05B 19/4065; G06N 20/00
See application file for complete search history.

(56) References Cited

U.S. PATENT DOCUMENTS

| 7,631,942 | B2 | 12/2009 | Steinberg et al. |
| 8,620,471 | B2 | 12/2013 | Turrini |
| 10,675,725 | B2 | 6/2020 | Archenti et al. |
| 11,326,869 | B2 * | 5/2022 | Lummes ................. G01B 7/34 |
| 2002/0013639 | A1 * | 1/2002 | Fujishima .......... G05B 19/4065 |
| | | | 700/169 |
| 2002/0091460 | A1 * | 7/2002 | Allen ................. G05B 19/4166 |
| | | | 700/173 |

(Continued)

FOREIGN PATENT DOCUMENTS

| CN | 101111662 A | 1/2008 |
| CN | 101903835 A | 12/2010 |

(Continued)

*Primary Examiner* — Tuan C Dao
(74) *Attorney, Agent, or Firm* — The Belles Group, P.C.

(57) ABSTRACT

An operating device for a machine tool, the operating device comprising at least one spindle or electrospindle, sensor means to measure at least one operating parameter of the operating device and an electronic control unit, which comprises a processing and control unit, data acquisition devices configured to acquire machine data concerning the operation of the machine tool, a memory to store measured values of the operating parameter of the operating device and the machine data, and a communication module, preferably wireless, configured to transmit the measured values and the machine data to a server, which is remotely accessible and comprises a database, and/or to a mobile communication device.

12 Claims, 1 Drawing Sheet

(56) References Cited

U.S. PATENT DOCUMENTS

| | | | |
|---|---|---|---|
| 2003/0103827 A1* | 6/2003 | Moller | B23Q 5/10 |
| | | | 409/231 |
| 2003/0155415 A1* | 8/2003 | Markham | G06Q 50/00 |
| | | | 235/376 |
| 2005/0021712 A1* | 1/2005 | Chassapis | G08C 17/00 |
| | | | 709/223 |
| 2007/0033069 A1* | 2/2007 | Rao | A63B 71/0622 |
| | | | 482/8 |
| 2008/0116734 A1* | 5/2008 | Bechem | E21C 27/22 |
| | | | 299/10 |
| 2010/0256799 A1* | 10/2010 | Turrini | G05B 19/401 |
| | | | 700/186 |
| 2010/0305898 A1 | 12/2010 | Yamaguchi et al. | |
| 2012/0158170 A1 | 6/2012 | Bornemann et al. | |
| 2013/0159350 A1* | 6/2013 | Sankar | H04L 67/125 |
| | | | 707/E17.005 |
| 2014/0262392 A1* | 9/2014 | Petrossians | G01M 1/36 |
| | | | 73/458 |
| 2016/0231108 A1* | 8/2016 | Bucher | G01B 5/28 |
| 2017/0241955 A1* | 8/2017 | Meek | G01M 3/26 |
| 2018/0276570 A1* | 9/2018 | Watanabe | G05B 19/042 |
| 2019/0005413 A1* | 1/2019 | Sato | G05B 19/4061 |

FOREIGN PATENT DOCUMENTS

| | | |
|---|---|---|
| CN | 102554699 A | 7/2012 |
| CN | 105759719 A | 7/2016 |
| CN | 105881099 A | 8/2016 |
| EP | 1995018 | 11/2008 |
| WO | WO2018/074799 | 4/2018 |

* cited by examiner

OPERATING DEVICE FOR A MACHINE TOOL

CROSS-REFERENCE TO RELATED APPLICATIONS

The present application is a U.S. national stage application under 35 U.S.C. § 371 of PCT Application No. PCT/IB2019/057402, filed Sep. 3, 2019, which claims priority from Italian Patent Application No. 102018000008297 filed on Sep. 3, 2018, the entire disclosure of which is incorporated herein by reference.

TECHNICAL FIELD

The present invention relates to an operating device for a machine tool.

In particular, the present invention finds advantageous, but not exclusive, application in machine tools for the machining of wood and derivatives, stone, glass, metals, composite or plastic materials in general, comprising one or more operating devices, for example a birotative head, which comprises a tilting head and a respective electrospindle, or a boring head, which comprises a plurality of spindles, or a single electrospindle, to which the following description will make explicit reference without any loss of generality.

BACKGROUND ART

Normally a machine tool for the machining of a material such as wood, stone, glass, metals, composite or plastic materials in general comprises one or more operating devices on board that are suitable for machining the material, such as, for example, simple electrospindles provided with their respective tools, birotative heads, or boring heads. Typically, in order to improve the quality of the machining operations of a machine tool or simply to deal with the breakage of one or more electrospindles, the individual operating devices are replaced with devices having similar generic characteristics.

The new operating devices replacing the old ones often have improved characteristics and/or are equipped with more advanced electronics and sensors.

For example, the US patent application published under no. US 2003/0103827 A1 describes an electrospindle for a machine tool. This electrospindle comprises a housing to house an electric motor and a relative motor shaft, a coupling member attached to the motor shaft for the engagement of a tool suitable for machining pieces, a plurality of sensors to measure parameters concerning the operation of the electrospindle and a memory to store the measured values of the parameters. The sensors are connected directly to the computer numerical control unit of the machine tool to transmit the measured values of the parameters to the machine tool, or the measured values can be read from the outside via a communication interface that is integrated into the electrospindle.

However, in order to contain the upgrading costs, the machine tool often does not have a suitable computer numerical control unit installed capable of using the additional information provided by the sensors of the new operating devices that could help to increase the efficiency of the machine tool.

DISCLOSURE OF INVENTION

The purpose of the present invention is to compensate for the lack of suitable monitoring electronics on the machine tool for the purpose of exploiting the potential of new operating devices mounted on the machine tool itself, in a simple and cost-effective way.

In accordance with the present invention, an operating device, in particular an electrospindle, for a machine tool, a machine tool, a system for collecting machine tool operating data, and a method for collecting machine tool operating data, as defined in the attached claims, are provided.

BRIEF DESCRIPTION OF THE DRAWINGS

The present invention will now be described with reference to the accompanying drawings, which show a non-limiting embodiment thereof, wherein.

BEST MODE FOR CARRYING OUT THE INVENTION

Figure 1:
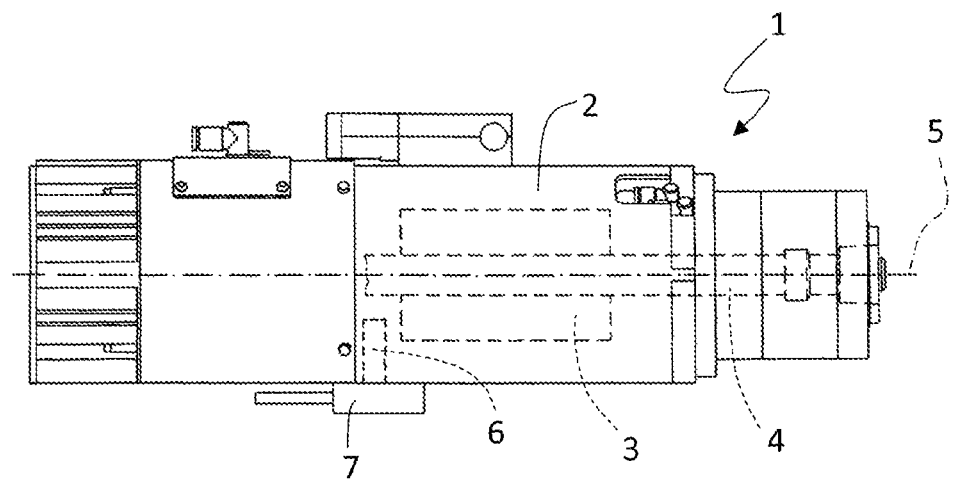
FIG. 1 shows, according to a lateral view with parts removed for clarity, the operating device of the present invention.

In FIG. 1, the number 1 generally designates, as a whole, an electrospindle comprising an outer casing 2, which internally houses an electric motor 3 that is provided with an output shaft 4 rotating with respect to an axis 5. The output shaft 4 is in turn provided with a coupling member—known and not shown—for the engagement of a tool, which is also known and not shown. The electrospindle 1 is part of a machine tool (not shown), for example a machine tool for machining a material such as wood and derivatives, stone, glass, metals, composite or plastic materials in general, configured to advance the electrospindle 1 itself in a known way along three directions substantially orthogonal to each other according to the machining operations to be performed and the dimensions and shapes of the pieces to be machined.

The electrospindle 1 comprises one or more sensors 6 housed inside the outer casing 2 to measure one or more operating parameters PS of the electrospindle 1. According to one embodiment not shown, the sensors 6 are mounted outside the outer casing 2.

The operating parameters PS are selected from a group consisting of:
- instantaneous temperature and maximum temperature of the electrospindle 1 in general or of various parts of the electrospindle 1, such as the stator, front and rear bearings, inflow and outflow of the coolant if used, rotor, motor shaft, electronic board;
- ambient temperature, ambient humidity and atmospheric pressure;
- magnitudes or events indicative of the operating status of parts of the electrospindle 1, such as bearing wear, rotor cage breakages, air gap operating anomalies, stator insulation leakages;
- operating status of each electric or electronic apparatus of the electrospindle 1;
- magnitudes concerning the electric operation of the electrospindle 1, such as current absorbed by the electric motor 3, frequency of operation of the electric motor 3, supply voltage of the electric motor 3, phase shift supply voltage, torque delivered, power delivered, power dissipated and instantaneous output;
- magnitudes concerning the mechanical operation of the electrospindle 1, such as instantaneous speed, maximum speed, instantaneous acceleration and maximum acceleration of the output shaft 4, vibrations of the electrospindle 1, acceleration of the electrospindle 1 in the three directions of advancement, position of the coupling member along and/or around the axis 5 itself, quality of the coupling between the tool and the coupling member, flow rate of the coolant (if the electrospindle 1 is fluid-cooled), tool coupling force, static and dynamic forces, bearing pre-load, mass of the tools coupled to the electrospindle 1, geometrical variations of components, e.g. elongations, position and movements of bodies, e.g. a tie rod; and statistics on the operation of the electrospindle 1, such as, for example, total operating time, operating time at various speeds, number of ignitions, number of tool changes, tool blocking and unblocking times.

The electrospindle 1 also comprises an electronic control unit 7 mounted on the outer casing 2.

Figure 2:
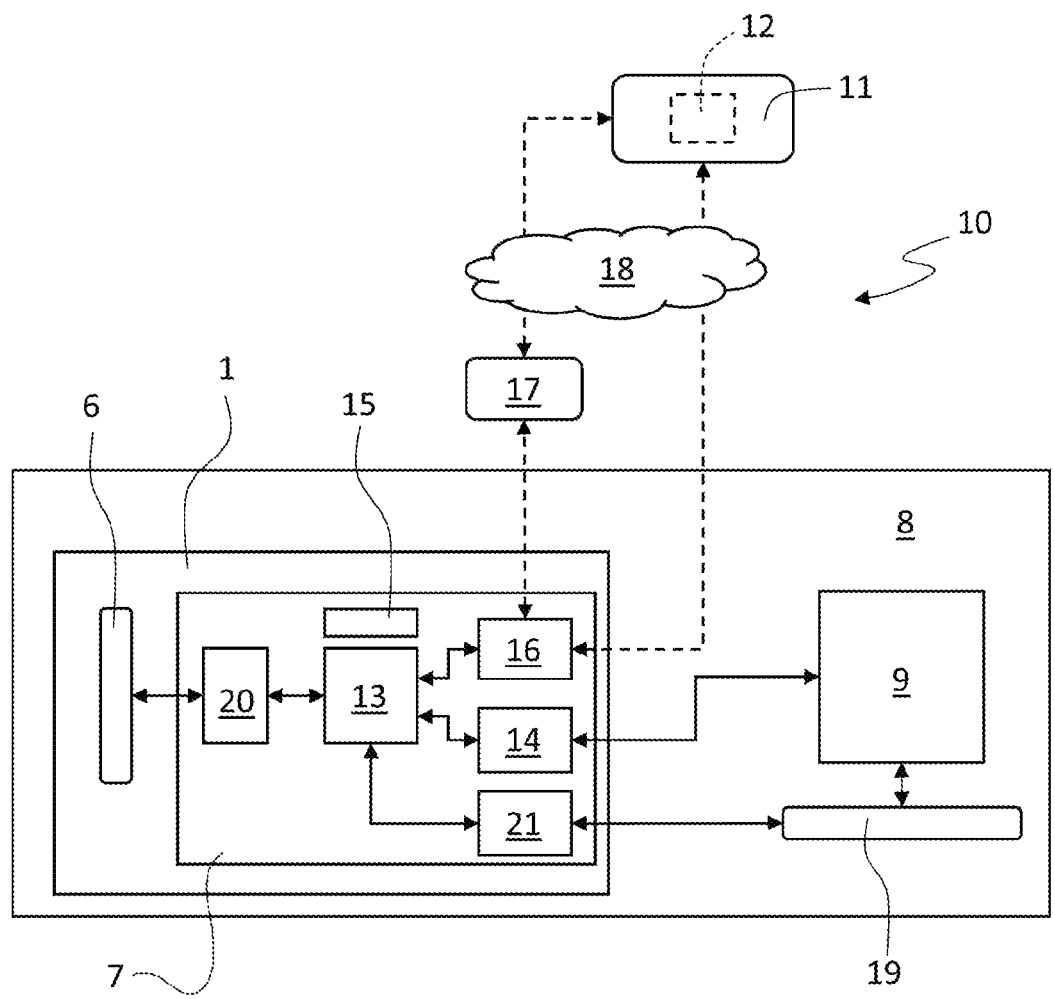
FIG. 2 shows a block diagram of a system for collecting machine tool operating data, this system being partly mounted on the operating device in FIG. 1 and made according to the present invention.

In FIG. 2, the number 10 designates, as a whole, a system for collecting operating data concerning the machine tool, the latter being shown schematically with a rectangular block indicated with the number 8 and comprising a computer numerical control unit 9. The machine tool 8 comprises the electrospindle 1, schematically shown with a rectangular block in FIG. 2, provided with sensors 6.

The system 10 comprises a server 11, which is external to the machine tool 8 and remotely accessible via the Internet and comprises a database 12 wherein to store machine tool operating data 8, and the electronic control unit 7 of the electrospindle 1.

The electronic control unit 7 comprises: a processing and control unit 13, comprising e.g. a microprocessor; a wired machine interface device 14, for example a so-called fieldbus, or a wireless device, to connect the processing and control unit 13 communicatively to the computer numerical control unit 9 of the machine tool 8 and configured to acquire machine data concerning the operation of the machine tool 8 itself; a memory module 15 to store machine data at least temporarily; and a wireless communication module 16, for example a Wi-Fi module, configured to transmit machine data to the server 11 or to a mobile communication device 17, such as, for example, a tablet or a personal computer, which, in turn, is connected communicatively and wirelessly to the server 11. The connection between the wireless communication module 16 or the mobile communication device 17 and the server 11 is made, for example, via the Internet 18.

According to a variant of the invention not shown, the electronic control unit 7 comprises a wired communication module instead of the wireless communication module 16.

The machine data comprise measured values of one or more operating parameters PM of the machine tool 8 selected from a group consisting of:

machine tool operating states 8, such as setup state, emergency state, work state (i.e. when the machine is performing a certain task for which it is designed), maintenance state, operating state of the main and auxiliary members (pumps, servomotors, cooling systems) of the machine tool 8;

duration of stay in the operating states of the machine tool;

temperature, current absorption, and vibrations of the machine tool 8.

The operating parameters PM are monitored and/or measured by means of one or more known sensors mounted on the machine tool 8 and indicated together with the number 19 in FIG. 2.

The electronic control unit 7 also comprises an analogue, digital, magnetic, or optical sensor interface device 20 for connecting the sensors 6 to the processing and control unit 13. The measured values of the operating parameters PS acquired by means of the sensors 6 are stored at least temporarily in the memory module 15 and are also transmitted to the server 11 or to the mobile communication device 17 by means of the wireless communication module 16. In addition or alternatively, the operating parameters PS are transmitted to the computer numerical control unit 9 via the interface device 14.

Optionally, the electronic control unit 7 comprises an additional sensor interface device 21 for connecting the sensors 19 to the processing and control unit 13 and configured to acquire measured values of one or more operating parameters PM. In this way, the electronic control unit 7 can acquire at least part of the machine data directly from the sensors 19, without going through the computer numerical control unit 9, or partly from the sensors 19 and partly from the computer numerical control unit 9.

According to another embodiment of the present invention not shown, the processing and control unit 13 acquires machine data via the wireless communication module 16. For this purpose, the computer numerical control unit 9 is also provided with a wireless communication module.

According to another embodiment of the present invention not shown, the processing and control unit 13 of the electronic control unit 7 mounted on the electrospindle 1 is configured to autonomously determine some machine data as a function of the measured values of the operating parameters PS obtained by means of the sensors 6, i.e. without the aid of the sensors 19 and of the sensor interface device 21, or without the aid of the computer numerical control unit 9 and of the machine interface device 14. This is made possible by the fact that the electrospindle 1 is part of the machine tool 8, i.e. it is mounted fixed or mobile on a frame (not shown) of the machine tool 8, and therefore the operating parameters PS measured by the sensors 6 are affected by the mechanical and electrical behaviour of the machine tool 8.

For this purpose, the processing and control unit 13 is configured to implement at least one appropriate calculation algorithm, e.g. based on the neural networks or artificial intelligence, designed to process the measured values of the operating parameters PS so as to estimate one or more operating parameters PM selected from a group consisting of:

machine tool operating states 8, such as machine standstill, machine running empty, and machine processing a piece;

duration of stay in the aforesaid operating states of the machine tool;

the operating state (stationary or moving) of the moving members of the main axes of the machine tool 8; and anomalous vibrations of the machine tool 8.

Thus, the electrospindle 1 that is provided with the electronic control unit 7 acts as a data collection hub for collecting machine data concerning the machine tool 8, including measured values provided by the sensors 19 mounted on the machine tool 8 and measured values provided by the sensors 6 of the electrospindle 1. In this way, it is possible to collect the total machine data of the machine tool 8 and the measured values from the sensors 6 and to transmit them to the external server 11 without having to update, modify, or replace the computer numerical control unit 9. In other words, the present invention allows the transformation of a "low-end" machine tool, i.e. one without advanced data processing capability and/or without latest generation of communication and data sharing interfaces, into a "high-end" machine tool.

It should be noted that the invention described above is applicable to any operating device or component that can be installed on a machine tool, such as a boring head, or a birotative head, or a single electrospindle. In other words, the aforesaid data collection hub generally consists of an operating device that comprises the electronic control unit 7 and at least one spindle or at least one electrospindle 1.

The invention claimed is:

1. An operating device for a machine tool, the operating device comprising at least one spindle or electrospindle, sensor means to measure at least one operating parameter of the operating device and an electronic control unit, which comprises processing and controlling means, storage means to store measured values of said at least one operating parameter of the operating device, and a wireless communication means configured to transmit said measured values to a server, which is remotely accessible, and/or to a mobile communication device;
wherein said electronic control unit further comprises data acquisition means configured to acquire machine data concerning the operation of the machine tool and a first sensor interface means to connect said sensor means to said processing and controlling means, the storage means are to store said machine data and the wireless communication means are configured to transmit said machine data to the server, which comprises a database for storing said machine data, and/or to the mobile communication device; and
wherein said machine data comprises additional measured values of at least one operating parameter of the machine tool, said machine tool comprising additional sensor means to measure said at least one operating parameter of the machine tool and said data acquisition means comprising a second sensor interface means to connect said additional sensor means to said processing and controlling means and configured to acquire said additional measured values.

2. The operating device according to claim 1 and mountable, in a fixed manner, on a frame of said machine tool; said processing and controlling means being configured to determine at least part of said machine data as a function of said at least one operating parameter of the operating device.

3. The operating device according to claim 2, wherein said processing and controlling means are configured to process said at least one operating parameter of the operating device so as to estimate at least one operating parameter of the machine tool selected from a group including one or more of:
operating states of the machine tool comprising machine standstill, machine running empty, and machine processing a piece;
duration of stay in the aforesaid operating states of the machine tool;
operating state of the moving members of the main axes of the machine tool; and/or
anomalous vibrations of the machine tool.

4. The operating device according to claim 1, wherein said additional measured values of at least one operating parameter of the machine tool are selected from a group including one or more of:
operating states of the machine tool, comprising setup state, emergency state, work state, maintenance state, state of single members of the machine tool;
duration of stay in said operating states of the machine tool; and/or
temperature, current absorption, and vibrations of the machine tool.

5. The operating device according to claim 1, wherein said data acquisition means comprise machine interface means suitable for communicatively connecting said processing and controlling means to computer numerical control means of the machine tool and configured to acquire said machine data.

6. A machine tool comprising computer numerical control means and at least one operating device according to claim 1.

7. A system to collect operating data of a machine tool, which comprises computer numerical control means and at least one operating device according to claim 1, the system comprising said electronic control unit of the operating device and said server.

8. A method to collect operating data of a machine tool, which comprises at least one operating device comprising at least one spindle or electrospindle and provided with an electronic control unit, the electronic control unit comprising a processing and controlling means, the method comprising:
measuring at least one operating parameter of the operating device via sensor means on board the operating device itself;
connecting said sensor means to said processing and controlling means via a first sensor interface;
at least temporarily storing measured values of said at least one operating parameter of the operating device in memory means of the electronic control unit; and
transmitting said measured values from the electronic control unit to a server, which is remotely accessible, and/or to a mobile communication device;
wherein the method further comprises:
by the electronic control unit, acquiring machine data concerning the operation of the machine tool via a data acquisition means;
at least temporarily storing said machine data in memory means;
transmitting said machine data from the electronic control unit to the server, which comprises a database; and
acquiring additional measured values of at least one operating parameter of the machine tool, said machine tool comprising additional sensor means to measure said at least one operating parameter of the machine tool and said data acquisition means comprising a second sensor interface means to connect said additional sensor means to said processing and controlling means.

9. The method according to claim 8, wherein acquiring machine data concerning the operation of the machine tool comprises:
at least temporarily storing said additional measured values in said memory means; and
transmitting said additional measured values from the electronic control unit to said server and/or to said mobile communication device.

10. The method according to claim 8, wherein said machine tool comprises computer numerical control means; acquiring machine data concerning the operation of the machine tool comprising:
transmitting machine data concerning the operation of the machine tool {-8} from the computer numerical control means to the electronic control unit.

11. The method according to claim 8, wherein acquiring machine data concerning the operation of the machine tool comprises:
    determining at least part of said machine data as a function of measured values of said at least one operating parameter of the operating device.

12. The method according to claim 11, wherein determining at least part of said machine data as a function of measured values of said at least one operating parameter of the operating device comprises:
    processing the measured values of said at least one operating parameter of the operating device by means of an algorithm based on neural networks or on artificial intelligence so as to estimate at least one operating parameter of the machine tool;
    said at least one operating parameter of the machine tool being selected from a group including one or more of:
    operating states of the machine tool comprising machine standstill, machine running empty, and machine processing a piece;
    duration of stay in the aforesaid operating states of the machine tool;
    operating state of the moving members of the main axes of the machine tool; and/or
    anomalous vibrations of the machine tool.

* * * * *